United States Patent [19]

Cove

[11] Patent Number: 4,540,022

[45] Date of Patent: Sep. 10, 1985

[54] CHOKE FOR DRILLING OR PRODUCTION USE

[75] Inventor: Harry R. Cove, 3007 - 110 St., Edmonton, Alberta, Canada

[73] Assignees: Harry R. Cove; Gary R. Williams, both of Canada

[21] Appl. No.: 383,550

[22] Filed: Jun. 1, 1982

[51] Int. Cl.³ .................. F16K 11/07; F16K 3/24; F16K 47/04

[52] U.S. Cl. .................. 137/625.3; 137/625.37; 251/210

[58] Field of Search .......... 137/625.33, 625.3, 625.38, 137/625.37; 251/282, 210

[56] References Cited

U.S. PATENT DOCUMENTS

| | | | |
|---|---|---|---|
| 285,955 | 10/1883 | Barry | 137/625.37 |
| 791,256 | 5/1905 | Durrant | 251/210 |
| 920,392 | 5/1909 | Rider | 251/206 X |
| 2,023,350 | 12/1935 | Armstrong | 251/210 |
| 2,327,366 | 8/1943 | Nampa | 251/138 X |
| 3,521,853 | 7/1970 | Gillis, Jr. et al. | 251/210 X |
| 4,376,448 | 3/1983 | Skough | 137/625.33 X |

FOREIGN PATENT DOCUMENTS 967482 8/1964 United Kingdom .......... 137/625.23

*Primary Examiner*—Arnold Rosenthal
*Attorney, Agent, or Firm*—Max L. Wymore

[57] ABSTRACT

A choke is provided having a stationary tubular flow nozzle with throttling ports formed through its side wall. A movable tubular throttling ring may be moved over the nozzle to restrict or close the ports. The required liquid-tight seal or shut-off is obtained with annular seal surfaces formed on the nozzle and ring but remote from and upstream of the ports, so that erosion of these seal surfaces, by the high velocity streams passing through the ports, is minimized.

1 Claim, 6 Drawing Figures

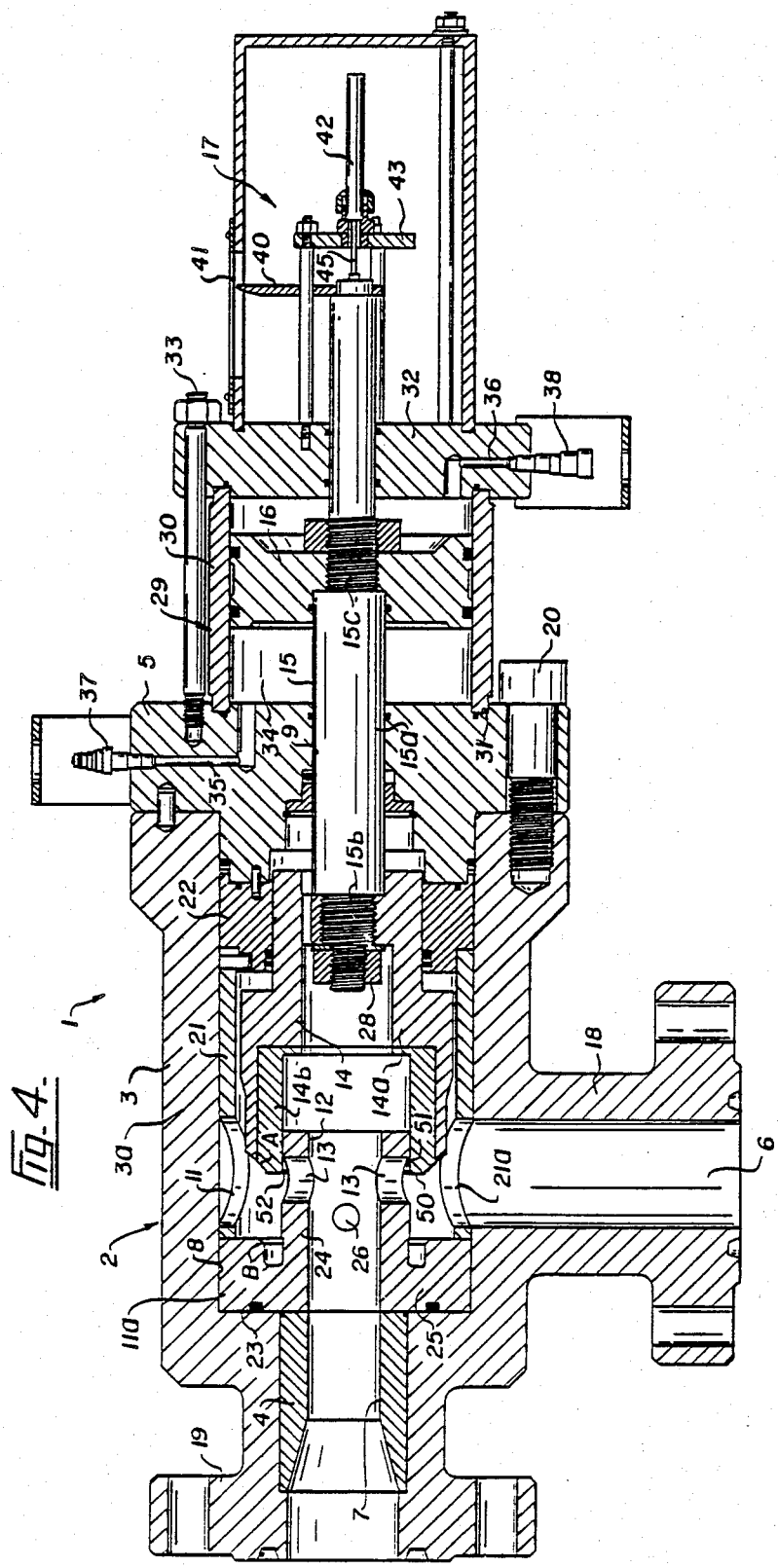

4,540,022

CHOKE FOR DRILLING OR PRODUCTION USE

BACKGROUND OF THE INVENTION

1. Field of the Invention

This invention relates to a choke, such as a drilling or production choke.

2. Description of the Prior Art

Chokes are devices commonly used in the oilfields to restrict or shut off pressurized flow through a flowline.

The fluid streams with which chokes are used are frequently laden with abrasive material, such as rock cuttings and sand. These streams can erode or wear through even the hardest steels. Over the years, therefore, there has been much thought and innovation applied to chokes, with a view to improving their durability.

Following below is a short discussion of three types of prior art chokes which are in commercial use today. Some of their strengths and weaknesses, which are of interest, are touched upon.

The oldest of the three types may be referred to as a needle-and-seat choke. A simplified schematic representation of this type of prior art choke is shown in FIG. 1A. The choke includes a hollow body assembly a, which body assembly defines inlet and outlet bores b, c joined by a main bore d. A tubular throttling member or ring e is positioned in the main bore d at the entry to the outlet bore c. A plug or needle member f is mounted on a valve stem, for movement into or out of the throttling ring e. Entry of the needle member f into the throttling ring e forms a restricted annular throttling passage g, defined by the throttling surfaces h, i of the throttling ring and needle member.

It will be noted that the throttling surfaces h, i are large in surface area, they are contiguous to the restricted or high velocity flow zone, and they are relied on to provide the final or complete shut-off. Because of their proximity to the high velocity flow, these throttling surfaces erode rapidly and soon lose their capability for providing an effective shut-off. Also, the annular fluid jet issuing from the annular passage g is found to have a particular capability for eroding the downstream surface j of the outlet bore c. Although abrasion-resistant steel collars are used to form the outlet bore c, wear at this point is still a problem with needle-and-seat type chokes.

The second type of choke may be referred to as the rotating-disc choke. It is shown schematically in FIG. 1B. This choke comprises two abutting discs m, n. The discs are mounted to extend across the main bore of the choke. Each disc defines a semi-circular opening or port o, which is spaced outwardly from the disc's centre point. The upstream disc m is connected with a stem p. This stem may be rotated to bring the port of the upstream disc m into partial or complete register with the port of the downstream disc n. When the ports are in register, they form a throttling passage.

By utilizing a throttling passage which is a port, as distinct from an annular opening, the rotating-disc choke provides throttling surfaces which are reduced in area when compared with those of the needle-and-seat choke. The durability of the rotating-disc choke is significantly improved by this change.

However, significant erosion does occur at the disc surfaces r, s which are disposed transversely to the oncoming high velocity flow. This erosion soon leads to loss of complete shut-off capability. Also, the stream issuing from the partly registering ports is angularly directed. This angularity is induced by the misaligned positioning of the partly registering ports. The angularly directed flow causes damaging erosion of the bore surface downstream of the discs.

The third, and most recently developed, type of choke may be referred to as the advancing-cylinder choke. A recent form of this choke is illustrated schematically in FIG. 1C. An older version is shown in U.S. Pat. No. 4,132,386. With reference to FIG. 1C, the choke comprises a generally tubular nozzle member u, which is slidably disposed in the main bore of the choke body assembly. The nozzle member bore v communicates with the outlet bore w of the choke. The nozzle member bore v is also connected with the choke inlet bore x by aligned ports y, which extend through the sidewall of the nozzle member and provide a throttling passage. A tubular throttling ring member z is also disposed in the main bore of the body assembly. This throttling ring member z may be advanced by a stem to slide over the nozzle member u and throttle the flow through the ports y. When the throttling ring member is approaching the end of its travel to the left, it contacts the nozzle member and biases it to the left. A deformable seal k, positioned between the end of the nozzle member and the body assembly, is thereby outwardly extruded and combines with the throttling ring to provide the liquid-tight shut-off or seal.

The advancing-cylinder choke is improved in that the aligned, opposed positioning of the throttling ports y results in the incoming streams impinging against one another; it is found that downstream wear is thereby significantly reduced. In addition, the utilization of throttling openings which are circular holes reduces wear of the throttling surfaces, as compared with that encountered with the needle-and-seat choke.

However, the advancing-cylinder choke has some undesirable features as well. Erosion of the leading corner 100 of the throttling ring member occurs, due to the proximity of this corner to the high velocity flow. When the surface of this eroded corner is required to cooperate with the deformable seal k to provide the liquid-tight shut-off, failure occurs. In addition, the need for a movable nozzle member requires that a retaining support means be provided, which is expensive.

With the foregoing comments in mind, there is therefore a need for an improved choke which adopts desirable features from the prior art and melds them with new additional features to provide a simple and durable device.

SUMMARY OF THE INVENTION

The present choke is an improved version of the advancing-cylinder type.

The choke has a stationary nozzle member and a movable throttling ring member. The throttling ring member comprises an annular shut-off seal surface which is remote from and upstream of the throttling ports. More particularly, the seal surface is to the outside and to the rear of the forward end surface of the ring member. The nozzle member is part of a stationary member or assembly mounted in the main bore of the choke body. On this stationary member there is provided a second annular shut-off seal surface which is also remote from and upstream of the throttling ports. More particularly, the second seal surface is spaced outwardly from and away from the ports, in a direction away from the throttling member. The two seal surfaces are positioned so as to meet, when the throttling ports are fully closed, to effect a liquid-tight seal or shut off. By this provision, the seal surfaces are spaced from the zone in the choke, i.e. adjacent the ports where restricted high velocity flow occurs and thus are at least partly saved from its erosional effect.

Broadly stated, the invention is a choke having a fluid flow path therethrough which is to be restricted or closed, comprising: a hollow body assembly having an inlet bore and an outlet bore substantially at right angles and a main bore which is an extension of the outlet bore and which communicates with the inlet bore; a stationary member positioned in the main bore, said stationary member comprising a tubular substantially open-ended nozzle member forming a first bore which communicates with the outlet bore and is substantially aligned therewith, said nozzle member forming only first and second pairs of substantially diametrically opposed ports, extending through its side wall, the centres of the second pair of ports being spaced from the centres of the first pair of ports in a direction away from the throttling member, the extent of spacing being sufficient so that the two pairs of ports do not overlap substantially, the area of each first port being substantially greater than the area of each second port, whereby fluid may enter the choke through the inlet bore and pass through the ports as impinging streams and continue out through the outlet bore; the inlet bore being substantially aligned with the ports to provide a generally straight upstream flowpath into the first bore; a movable tubular throttling member positioned within the main bore and adapted to be moved only over the outside surface of the nozzle member from its open-ended end to restrict the ports and thereby restrict the cross-sectional area of the flow path and accelerate the flow, said throttling member having a forward end surface which is exposed to the erosional effects of accelerated flow entering the restricted ports, said throttling member further having an annular first seal surface which is positioned outside and to the rear of said end surface, where it is remote from that part of the flow path where acceleration of the fluid flow occurs; means for moving the throttling member as required to open and restrict the ports; said stationary member having a second annular seal surface spaced radially outwardly from the ports and being longitudinally spaced away from them in a direction away from the throttling member, whereby said second seal surface is out of the line from the inlet bore to the ports and is therefore remote from that part of the flow path where acceleration of the fluid flow occurs, said second seal surface being adapted to meet with the first seal surface to prevent further flow through the ports.

DESCRIPTION OF THE DRAWINGS

Prior Art.

Figure 1A:
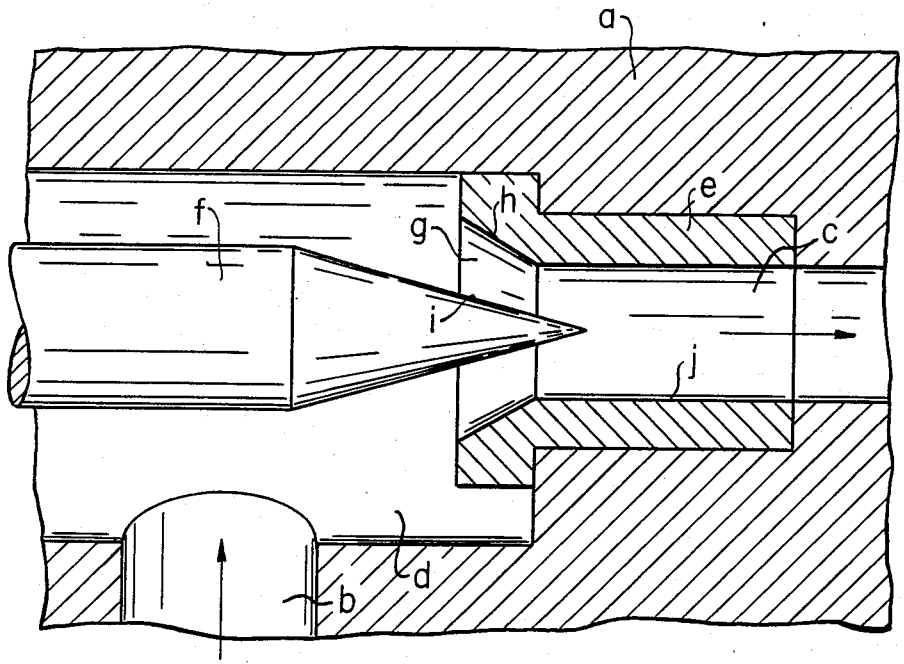
FIG. 1A is a simplified side view showing the working components of interest of a needle-and-seat choke.
Figure 1B:
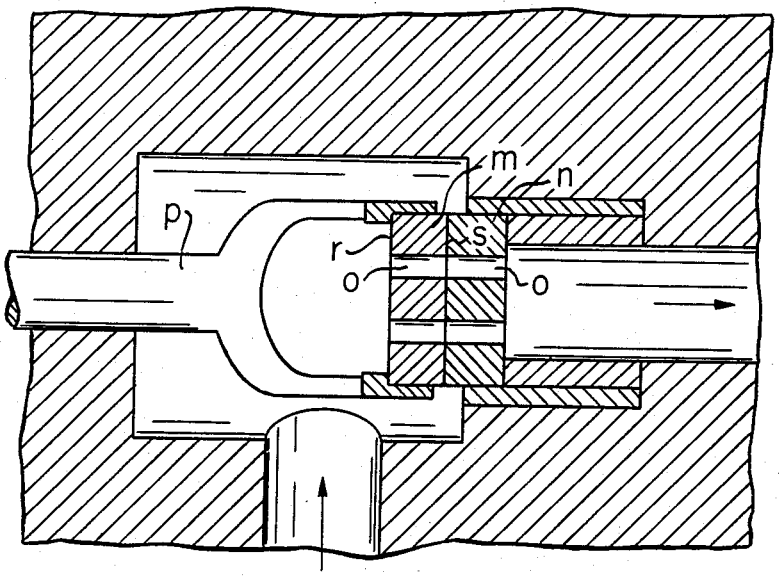
FIG. 1B is a simplified side view showing the working components of interest of a rotating-disc choke.
Figure 1C:
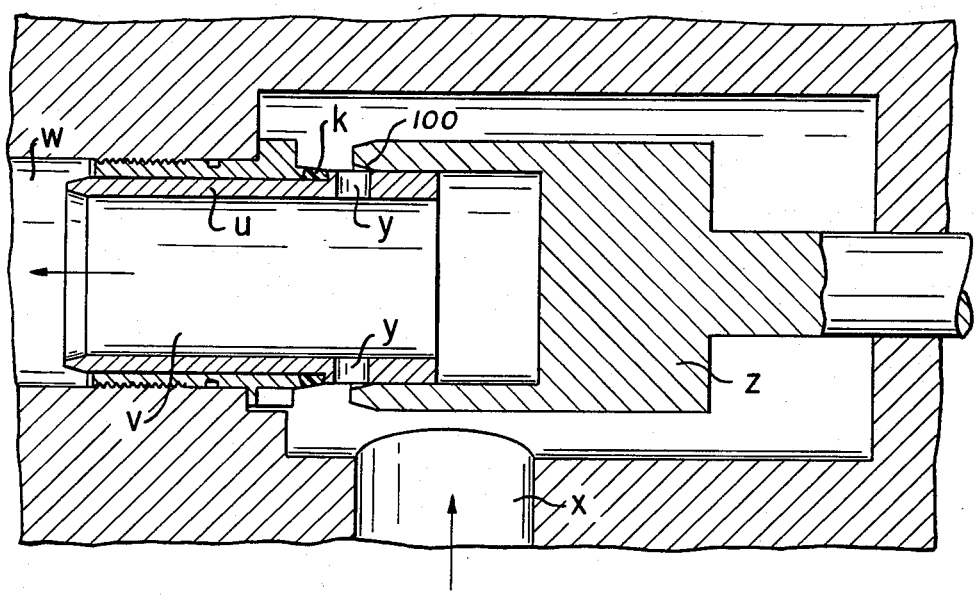
FIG. 1C is a simplified side view showing the working components of interest of an advancing-cylinder choke.
Figure 2:
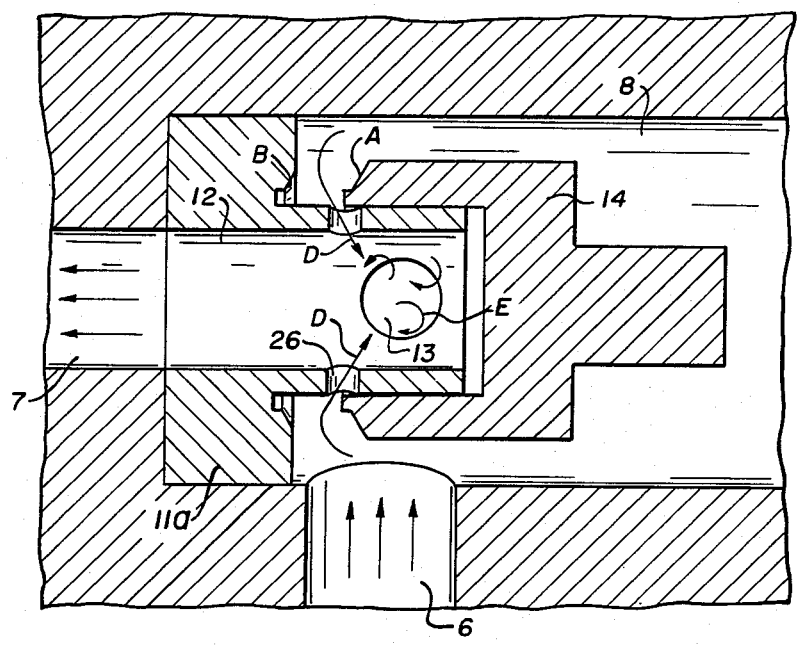
Figure 3:
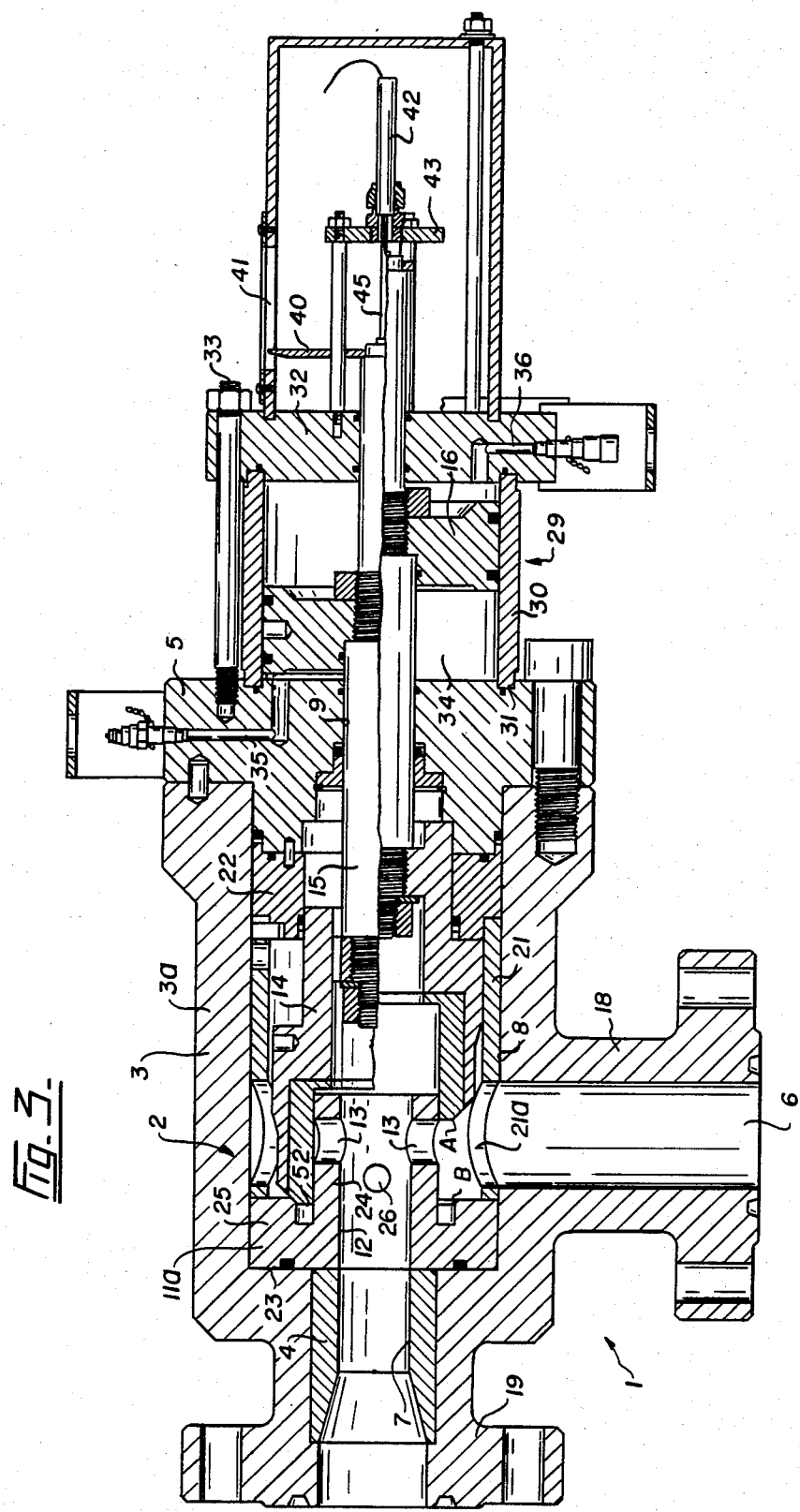

Present Invention:

FIG. 2 is a simplified side view showing the working components of primary interest of the present invention;

FIG. 3 is a side view in section of the present choke—the upper half of the figure shows the choke parts in the fully closed position and the lower half shows them in the fully open position; and FIG. 4 is a side view in section showing the choke parts in the partly open position.

DESCRIPTION OF THE PREFERRED EMBODIMENT

In General

With particular reference to FIG. 3, there is shown a choke 1, comprising a hollow body assembly 2. The body assembly 2 comprises a body 3, a wear sleeve 4 and a bonnet 5. The assembly 2 defines or forms an inlet bore 6, an outlet bore 7, and a main bore 8 joining the inlet and outlet bores. The inlet and outlet bores 6, 7 are at right angles and the main bore 8 forms an extension of the outlet bore 7. The bonnet 5 defines a stem bore 9, which is axially aligned with and communicates with the main bore 8.

A stationary member 11, comprising a generally tubular nozzle member 11a, is positioned within the body main bore 8. The nozzle member 11a defines a first bore 12 which communicates with the outlet bore 7. It also comprises a throttling passage which communicates with the inlet bore 6; the throttling passage is created by ports 13 which extend through the side wall of the nozzle member 11a.

A movable, tubular throttling member 14 is disposed within the main bore 8. This throttling member 14 is mounted on a stem 15, which may be biased or moved toward or away from the nozzle member 11a by a hydraulically actuated piston 16. In the course of this movement, the throttling member 14 slides longitudinally over the nozzle member 11 and partially or fully closes the throttling ports 13. When the throttling member 14 has moved over the ports 13 and closed them, the annular seal surface A on the throttling member 14 mates with the annular seal surface B on the nozzle member 11, to effect a substantially liquid-tight shut-off.

Indicator means 17, connected with the stem 15, provide an indication of the position of the throttling member 14, and thus of the area of the throttling ports 13 which is open for flow. The flow rate through the choke is directly related to this area.

The Body Assembly

As previously stated, the body assembly 2 comprises a hollow body 3, a wear sleeve 4 and a bonnet 5.

The body 3 is generally T-shaped. It includes: a flanged inlet means 18, which defines or forms a vertically extending inlet bore 6; a flanged outlet means 19, comprising the replaceable wear sleeve 4, which defines a horizontally extending outlet bore 7; and a main body segment 3a, which defines the horizontally extending main bore 8.

The bonnet 5 closes off the open end of the main bore 8. It is secured to the main body segment 3a by bolts 20.

The Stationary Member

The stationary member 11 comprises a trio of annular components arranged in abutting relation to extend between the shoulder 23 of the outlet means 19 and the bonnet 5. More particularly, the member 11 comprises the nozzle member 11a, the spacer 21, and a retainer sleeve 22.

The nozzle member 11a comprises a tubular segment 24, spaced inwardly from the surface of the main bore 8, and a flange section 25, which has a close fit in said bore. A first bore 12 extends horizontally through the nozzle member 11. The tubular segment 24 defines two pairs of diametrically opposed throttling ports 13, 26 which are adapted to connect the first bore 12 with the inlet bore 6, whereby the bores 6, 7, 8 and ports 13, 26 may provide the fluid flow path through the choke.

The retainer sleeve 22 abuts the bonnet 5 and acts as a bearing for the stem 15. It also provides a sealing function, as described below.

The tubular spacer 21 fits snugly between the nozzle member flange section 25 and the retainer sleeve 22, with the result that these components are fixed between the bonnet 5 and body shoulder 23. The spacer 21 also defines a port 21a, which permits fluid communication between the inlet bore 6 and main bore 8.

When the choke 1 is in use, pressurized fluid proceeds through the inlet bore 6, the spacer port 21a, the main bore 8, the throttling ports 13, 26 the nozzle member bore 12, and exits through the outlet bore 7.

The Stem Assembly

The stem assembly comprises a stem 15 and means for biasing the inner end of said stem back and forth within the main bore 8 of the choke.

The stem 15 comprises a cylindrical portion 15a which extends inwardly into the body assembly 2 through the bore 9 of the bonnet 5. At its inner end 15b, the stem 15 is reduced in diameter and threaded. The throttling member 14 is screwed onto the stem inner end 15b and secured in place with a nut 28.

A hydraulic cylinder 29 is provided to bias the stem 15 in and out. The cylinder 29 comprises an annular barrel 30, whose inner end is seated in an annular groove 31 formed in the bonnet 5. A cap 32 is fitted to the outer end of the barrel 30 and is secured to the bonnet 5 by bolts 33. The barrel 30 and cap 32 combine to define a piston chamber 34. A piston 16 is threaded onto the reduced diameter, threaded outer end 15c of the stem 15. The piston 16 is thus positioned within the chamber 34. A hydraulic fluid passage 35 extends through the bonnet 5 and communicates with the chamber 34; a similar passage 36 extends through the cap 32 and communicates with said chamber 34. Hydraulic hose fittings 37, 38 are provided at the outer ends of the passages 35, 36.

Hydraulic fluid may be selectively pumped into the inner or outer ends of the piston chamber 34 through the passages 35, 36 to bias the piston 16 and the attached stem 15 either out or in.

The hydraulic cylinder and stem combine to provide means, connected with the throttling member 14, for moving the latter between a first position, wherein the throttling ports are open, and a second position, wherein they are restricted or closed.

The Throttling Member

The throttling member 14 is positioned within the spacer 21 and may slide over the nozzle member 11a, with which it has a snug fit.

The throttling member 14 comprises a carrier 14a, which is threaded on the stem 15, and an insert 14b. The insert 14b is made of abrasion-resistant material and is tightly held by the carrier 14a.

The throttling member 14 may be biased to the left to partially and eventually completely close the throttling port 13. Restriction of fluid flow through the ports 13, 26 is effected by the leading corner 52 of the throttling member 14. This corner 52 is formed by throttling surfaces 50, 51.

Indicator Means

A pointer 40 is attached to the stem 15. This pointer 40 cooperates with a calibration plate 41 to provide a visual indication of the position of the stem 15, and thus of the extent of closure of the throttling ports 13, 26, which has been effected by the throttling member 14.

It will be noted that, in the preferred embodiment shown, first and second pairs of ports 13, 26 are provided. The second ports 26 are of small area relative to the first ports 13 and their centres are spaced from the centres of the first ports in a direction away from the throttling member 14. This arrangement is designed to reduce the severe erosion which occurs when the throttling member 14 reduces the open area of the first ports 13 to a mere slit. There are thus provided two opposed ports of each size, to provide impinging flow, and no more than a total of four ports, to maximize the opening position.

Alternatively, one may use a remote display system to indicate flow rate. Such a means is shown in the drawing and comprises a commonly used indicator potentiometer 42 attached to a mounting plate 43. A piston, internal of the potentiometer 42, is attached to the valve stem 15 by a rod 45 and is operative to move within the potentiometer 42 to vary its resistance. This change in resistance is sensed by suitable conventional means (not shown) and a signal may be emitted to actuate display means (not shown) at a remote location.

Sealing Means

An essential feature of the invention is the provision of annular shut-off sealing surfaces which are remote from and upstream of the throttling ports 13 and restricted, high velocity streams passing through them.

In the embodiment shown, the throttling member 14 is provided with an annular seal surface A.

The nozzle member 11a is also provided with an annular seal surface B, spaced away from and upstream of the throttling ports 13, 26. This surface B is positioned to mate with the surface A, when the throttling member 14 has closed the throttling ports 13, 26 to provide a shut-off seal.

O-ring seals are provided as shown in FIG. 3 to provide liquid tight seals as needed to contain the hydraulic operating fluid and to prevent leakage of the fluid flow. The areas of these seals have been balanced to minimize the hydraulic force needed to open and close the choke.

The foregoing is a description of one embodiment of the invention. The scope of the invention is defined by the following claims.

The embodiments of the invention in which an exclusive property or privilege is claimed are defined as follows:

1. A choke having a fluid flow path therethrough which is to be restricted or closed, comprising:
   a hollow body assembly having an inlet bore and an outlet bore substantially at right angles and a main bore which is an extension of the outlet bore and which communicates with the inlet bore;
   a stationary member positioned in the main bore, said stationary member comprising a tubular substantially open-ended nozzle member forming a first bore which communicates with the outlet bore and is substantially aligned therewith, said nozzle member forming only first and second pairs of substantially diametrically opposed ports, extending through its side wall, the centres of the second pair of ports being spaced from the centres of the first pair of ports in a direction away from the throttling member, the extent of spacing being sufficient so that the two pairs of ports do not overlap substantially, the area of each first port being substantially greater than the area of each second port, whereby fluid may enter the choke through the inlet bore and pass through the ports as impinging streams and continue out through the outlet bore;

the inlet bore being substantially aligned with the ports to provide a generally straight upstream flowpath into the first bore;

a moveable tubular throttling member positioned within the main bore and adapted to be moved only over the outside surface of the nozzle member from its open-ended end to restrict the ports and thereby restrict the cross-sectional area of the flow path and accelerate the flow, said throttling member having a forward end surface which is exposed to the erosional effects of accelerated flow entering the restricted ports, said throttling member further having an annular first seal surface which is positioned outside and to the rear of said end surface, where it is remote from that part of the flow path where acceleration of the fluid flow occurs;

means for moving the throttling member as required to open and restrict the ports;

said stationary member having a second annular seal surface spaced radially outwardly from the ports and being longitudinally spaced away from them in a direction away from the throttling member, whereby said second seal surface is out of the line from the inlet bore to the ports and is therefore remote from that part of the flow path where acceleration of the fluid flow occurs, said second seal surface being adapted to meet with the first seal surface to prevent further flow through the ports.

* * * * *